United States Patent [19]

Matsuki et al.

[11] Patent Number: 5,312,851
[45] Date of Patent: May 17, 1994

[54] WHOLLY AROMATIC POLYAMIDE RESIN COMPOSITION HAVING ENHANCED LIGHT RESISTANCE

[75] Inventors: Toshitsugu Matsuki; Tsutomu Kiriyama; Toshihiro Santa, all of Matsuyama, Japan

[73] Assignee: Teijin Limited, Osaka, Japan

[21] Appl. No.: 998,010

[22] Filed: Dec. 29, 1992

[30] Foreign Application Priority Data

Jan. 22, 1992 [JP] Japan .................. 4-9265

[51] Int. Cl.$^5$ .......................... C08K 5/3417
[52] U.S. Cl. .......................... 524/89; 524/94; 524/105; 524/220
[58] Field of Search ............ 524/89, 94, 105, 220

[56] References Cited

U.S. PATENT DOCUMENTS

| | | | |
|---|---|---|---|
| 3,340,225 | 9/1967 | Dressler et al. | 524/89 |
| 3,574,230 | 4/1971 | Cyba | 524/105 |
| 4,431,762 | 2/1984 | Araki et al. | 524/220 |
| 4,783,367 | 11/1988 | Maatman | 428/364 |

FOREIGN PATENT DOCUMENTS

| | | |
|---|---|---|
| 0231506 | 8/1987 | European Pat. Off. |
| 0247475 | 12/1987 | European Pat. Off. |
| 0248458 | 12/1987 | European Pat. Off. |
| 0147047 | 8/1984 | Japan ................ 524/94 |
| 6485316 | 3/1989 | Japan . |
| 1-240533 | 9/1989 | Japan . |
| 62263320 | 11/1989 | Japan . |
| 3-143922 | 6/1991 | Japan . |

OTHER PUBLICATIONS

Chemical Patents Index, Documentation Abstracts Journal Derwent Publications Ltd, London, GB 93-061703/08.

*Primary Examiner*—Kriellion S. Morgan
*Attorney, Agent, or Firm*—Burgess, Ryan & Wayne

[57] ABSTRACT

A light-resistant wholly aromatic polyamide resin composition comprises a light-resisting agent blended to a wholly aromatic polyamide resin and comprising at least one naphthalene ring structure-containing compound of the formula (I):

$$A-Y-Ar_1(-X-Ar_2-X-Ar_3)_n-Y-B \quad (I)$$

wherein $Ar_1$, $Ar_2$, $Ar_3$=a divalent organic group, X=an amide bond group (—CONH), Y=an amide bond group or an imide bond group

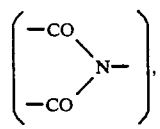

A and B=a monovalent organic group when Y=an amide bond group, or =a divalent organic group when Y=an imide bond group, n=1 to 10, and at least one of $Ar_1$, $Ar_2$, $Ar_3$, A and B has a naphthalene ring structure.

10 Claims, No Drawings

WHOLLY AROMATIC POLYAMIDE RESIN COMPOSITION HAVING ENHANCED LIGHT RESISTANCE

BACKGROUND OF THE INVENTION

1. Field of the Invention

The present invention relates to a wholly aromatic polyamide resin composition having an enhanced light resistance. More particularly, the present invention relates to a wholly aromatic polyamide resin composition comprising a light-resisting compound having at least one naphthalene ring structure and terminal-blocking amide groups and an enhanced light resistance.

2. Description of the Related Art

Wholly aromatic polyamide (aramid) resins have high mechanical strength, a superior modulus and excellent heat resistance and thus are widely useful as fiber and film-forming materials.

Nevertheless, it is well known that conventional wholly aromatic polyamide resins are disadvantageous in that they have poor light-resistance.

Japanese Unexamined Patent Publication No. 49-100,322 discloses a method of enhancing the light resistance of the conventional wholly aromatic polyamide resins by adding a benzotriazol type ultraviolet ray-absorbing agent and an antioxidant to a dope solution of a poly-m-phenylene isophthalamide resin in N-methylpyrrolidone. However, the light resistance-enhancing effect of this method is not satisfactory.

It is known that poly-p-phenylene terephthalamide (PPTA) resin does not easily melt and dissolve in a usual organic solvent, and can be shaped only by dissolving the PPTA resin in a special solvent, for example, sulfuric acid and then shaping the resultant dope solution.

The PPTA resin is different from usual fusible resins in that when an additive is mixed with a dope solution of the resin so as to impart a certain function to the resin, the additive must be stable in the special solvent such as sulfuric acid Accordingly, the additive usable for the PPTA. resins is restricted to those stable in the sulfuric acid solvent For example, Japanese Unexamined Patent Publication No. 64-85,316 discloses the addition of a carbon black to the PPTA resins. Also, Japanese Unexamined Patent Publication No. 64-14,317 discloses the addition of an organic pigment to the PPTA resins to enhance the light resistance thereof. However, the use of the carbon black and organic pigment colors the resultant shaped article, for example, fibers, to a particular shade. Namely, the shade of the resultant colored article is restricted to the specific color. Also, this addition of the carbon black or the organic pigment is disadvantageous in that it is difficult to uniformly disperse the carbon black or the organic pigment in the PPTA resin and the resultant shaped article, for example, fibers, exhibits unsatisfactory mechanical strength.

Further, in a usual method of producing a shaped article, for example, fibers, from a dope solution of an aramid resin mixed with an ultraviolet ray-absorbing agent, the resultant shaped article is usually drawn and/or heat treated at a high temperature, for example, 400° C. to 600° C. This high temperature drawing or heat-treating procedure causes the ultraviolet ray-absorbing agent to chemically decompose and thus the resultant shaped article exhibits substantially no ultraviolet ray-absorbing effect.

Furthermore, it is known that after shaping an aramid resin, it is very difficult to introduce and fix an additive to the shaped aramid resin article, because of high crystallinity and a high intermolecular chain force of the aramid resin.

To overcome this difficulty, Japanese Unexamined Patent Publication Nos. 49-75,824, 50-12,322, 53-35,020 and 1-240,533 and Japanese Examined Patent Publication No. 56-33,487 discloses a method of enhancing the light resistance of aramide fibers by impregnating water-swollen, undried aramide fibers with an ultraviolet ray-absorbing agent. This method, however, is disadvantageous in that impregnation with the additive disturbs the molecular chain structure of the aramid resin fibers and thus the mechanical properties thereof, for example, mechanical strength, are reduced. It is known that a blend of an aramid resin with a wholly aromatic polyamide having a naphthalene ring structure is usable for producing shaped articles, for example, fibers.

For example, Japanese Unexamined Patent Publication No. 62-263,320 discloses aramid fibers made from a blend of an aromatic copolyamide prepared by using a naphthalene ring structure-containing monomer with a poly-p-phenyleneterephthalamide. Also, Japanese Unexamined Patent Publication No. 3-143,922, Example 8, discloses aramid fibers prepared from a blend of a dope solution of a wholly aromatic polyamide having a naphthalene ring structure with a dope solution of another wholly aromatic polyamide resin free from the naphthalene ring structure.

These prior art references are effective for enhancing the mechanical strength of the resultant aramid fibers. Generally, organic polymers having a plurality of functional groups, for example, an amino group and a carboxyl group easily deteriorate or and discolored by a photo-decomposition.

These prior art references do not disclose or suggest block terminals of a naphthalene ring structure-containing a wholly aromatic polyamide molecule.

Also, Japanese Unexamined Patent Publication No. 63-75,111 discloses aramid fibers made from an aramid resin having a 2,6-naphthalamide structure. This 2,6-naphthalamide structure is introduced into the aramid resin by way of copolymerization of a 2,6-naphthalene ring structure-containing monomer. Namely, this Japanese publication does not disclose or suggest connecting terminal groups of the aramid molecules to non-reactive terminal groups.

SUMMARY OF THE INVENTION

An object of the present invention is to provide a wholly aromatic polyamide resin composition having high light resistance.

Another object of the present invention is to provide a wholly aromatic polyamide resin composition useful for forming shaped articles, for example, fibers or films, having high mechanical strength, a superior modulus and excellent light resistance even after a drawing and/or a heat treating procedure is applied to the shaped articles at a high temperature.

The above-mentioned objects can be attained by the wholly aromatic polyamide resin composition of the present invention, which comprises;

a matrix consisting essentially of a wholly aromatic polyamide resin; and a light-resisting agent blended to the wholly aromatic polyamide resin matrix and comprising at least one naphthalene ring - structure-containing compound of the formula (I);

wherein $Ar_1$, $Ar_2$, and $Ar_3$ respectively and independently from each other represent a divalent organic group, X represents an amide bond group of the —CONH— formula, Y represents a member selected from the group consisting of an amide bond group of the —CONH— formula and an imide bond group of the formula of:

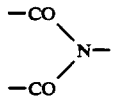

A and B respectively and independently from each other represent a monovalent organic group when Y represents the amide bond group and a divalent organic group when Y represents the imide bond group; n represents an integer of 1 or more, and at least one of $Ar_1$, $Ar_2$, $Ar_3$, A and B has a naphthalene ring structure.

The present invention includes a shaped article, for example, fiber or film, made from the wholly aromatic polyamide composition as mentioned above.

Also, the present invention includes a method of producing a shaped article from the wholly aromatic polyamide resin composition as mentioned above, wherein the wholly aromatic polyamide resin composition is dissolved in a non-proton donating polar organic solvent to provide an isotropic solution and the isotropic solution of the wholly aromatic polyamide resin composition is converted to a shaped article.

DESCRIPTION OF THE PREFERRED EMBODIMENTS

The wholly aromatic polyamide resin composition of the present invention contains a specific light-resisting agent blended to a wholly aromatic polyamide resin matrix.

The specific light-resisting agent comprises at least one naphthalene ring structure-containing compound of the formula (I):

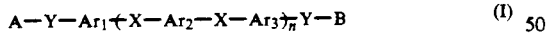

In the formula (I), $Ar_1$, $Ar_2$ and $Ar_3$ respectively and independently from each other represent a divalent organic group, preferably a divalent aromatic group. X represents an amide bond group of the —CONH— formula. Y represents an amide bond group of the —CONH— formula or an imide bond group of the formula:

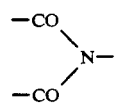

A and B respectively and independently from each other represent a monovalent organic group, preferably an aromatic group or aliphatic group when Y is the amino bond group, and a divalent organic group, preferably an aromatic group or aliphatic group when Y is the imide bond group, and n represents an integer of 1 or more, preferably 1 to 10. In the compound of the formula (I), it is important that at least one of $Ar_1$, $Ar_2$, $Ar_3$, A and B has a naphthalene ring structure. Preferably, the divalent organic group represented by $Ar_1$, $Ar_2$ and $Ar_3$ in the formula (I) is selected from the group consisting of unsubstituted and substituted 2,6-naphthalene, 1,5-naphthalene, 2,7-naphthalene, 1,4-phenylene, 1,3-phenylene, and 1,2-phenylene groups and the divalent aromatic groups of the following formulae:

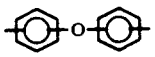

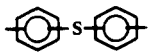

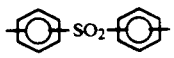

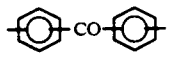

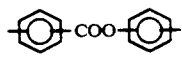

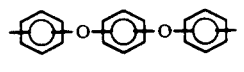

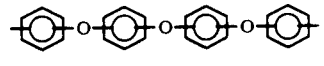

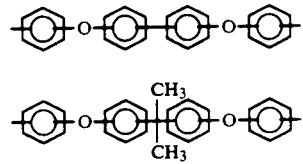

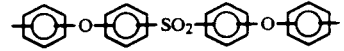

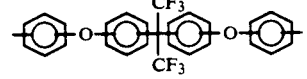

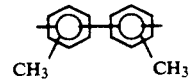

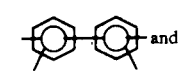

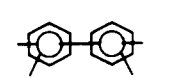

A more preferable divalent aromatic group for $Ar_1$, $Ar_2$ and $Ar_3$ is a 2,6-naphthalene group.

Also, to enhance the compatibility of the resultant compound of the formula (I) with the wholly aromatic polyamide resin, at least one of $Ar_1$, $Ar_2$ and $Ar_3$ in the formula (I) is preferably selected from the divalent aromatic groups of the formulae:

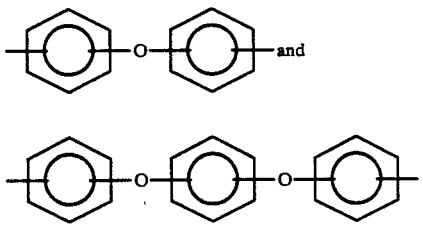

When Y is an amide bond group, the monovalent organic group represented by A and B in the formula (I) is preferably selected from the group consisting of unsubstituted and substituted 1-naphthyl, 2-naphthyl, and phenyl groups.

When Y is an imide bond group, the divalent organic group represented by A and B in the formula (I) is preferably selected from the group consisting of unsubstituted and substituted 1,2-naphthalene, 2,3-naphthalene, 1,8-naphthalene, 1,2-phenylene, ethylene and vinylene groups.

When the substituted organic groups represented by $Ar_1$, $Ar_2$, $Ar_3$, A and B in the formula (I) preferably has at least one substituent selected from the group consisting of —$CH_3$, —$OCH_3$, —Cl and —Br.

In the formula (I), the amide bond group represented by X and Y is of the —NH—CO— or —CO—NH— formula.

The imide bond group represented by Y is of the formula:

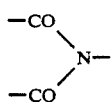

and bond to A and $Ar_1$, or B and $Ar_3$ in the following formula:

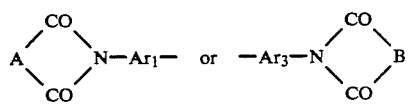

In the naphthalene ring structure-containing compound of the formula (I), the amide and imide bond groups can be formed by conventional methods.

In the formation of the amide bond group, a carboxylic acid component is reacted with an amine component. The carboxylic acid component is preferably selected from carboxylic acids, carboxylic acid halides, for example, carboxylic acid chloride, and carboxylic acid esters. In this reaction, a conventional amidization catalyst, a carboxylic group-activating agent and/or a dehydrating agent may be employed.

The imide bond group can be formed by a ring-closure reaction of a ring-closing dicarboxylic anhydride with an amine compound.

The naphthalene ring structure-containing compound of the formula (I) can be any conventional synthesis method.

For example, a dicarboxylic acid component and a diamine component are reacted with each other in an excessive amount of either one of the above-mentioned components, in a non-proton donating polar organic solvent, and then the resultant reaction product is reacted with a monoamine component when the dicarboxylic acid component is used in an excessive amount, or with a monocarboxylic acid component, preferably a monocarboxylic acid chloride or an imide ring-forming dicarboxylic anhydride when the diamine component is employed in an excessive amount.

The non-proton donating polar organic solvent preferably comprises at least one member selected from
N-methyl-2-pyrrolidone,
N-ethyl-2-pyrrolidone,
N,N-dimethylformamide,
N,N-dimethylacetamide,
N,N-diethylacetamide,
N,N-dimethylpropionamide,
N,N-dimethylbutylamide,
N,N-dimethylisobutylamide,
N-methylcaprolactam,
N,N-dimethylmethoxyacetamide,
N-acetylpyrrolidine,
N-acethylpiperidine,
N-methylpiperidone-2,
N,N'-dimethylethyleneurea,
N,N'-dimethylpropyleneurea,
N,N,N',N'-tetramethylmalonamide,
N-acetylpyrrolidone,
N,N,N',N'-tetramethylurea, and
dimethylsulfoxide.

In the preparation of the compound of the formula (I), the molar ratio of the dicarboxylic acid component to the diamine component is variable depending on the desired molecular weight of the compound. Generally, when a high molecular weight of the compound of the formula (I) is desired, the molar ratio of the dicarboxylic acid component to the diamine component should be 1 or around 1. When a relatively low molecular weight of the compound is desired, the molar ratio should be more than 1 or less than 1.

When the dicarboxylic acid component is used in an excessive amount, the resultant compound has terminal carboxylic acid groups. When the diamine component is employed in an excessive amount, the resultant compound has terminal amino groups.

In the present invention, there is no specific limitation for the molecular weight of the compound of the formula (I). Generally, it is preferable that the compound of the formula (I) be a logarithmic viscosity number of 4.0 or less, determined in a concentration of 0.5 g/100 ml in a 98% sulfuric acid at a temperature of 30° C. If the molecular weight is too high, the resultant compound of the formula exhibits reduced compatibility with the wholly aromatic polyamide resin matrix and thus the resultant shaped article exhibits reduced mechanical properties. However, the compound of the formula (I) is allowed to have a high molecular weight as long as the compatibility of the compound with the resin matrix and the mechanical properties of the resultant shaped article are satisfactory.

The proportional amount of the dicarboxylic acid component and the diamine component with respect to the solvent are not limited to a specific value or range thereof, as long as the components can be uniformly reacted with each other. To enhance the solubility of the components in the solvent, an inorganic additive comprising at least one member selected from calcium chloride, lithium chloride, sodium chloride and potassium chloride is introduced. Also when the reaction of the dicarboxylic acid component with the diamine component causes a generation of a hydrogen halide, a conventional organic or inorganic neutralizing agent may be added to the reaction mixture to neutralize the hydrogen halide.

Generally, when the reaction product having a plurality of reactive terminal groups, for example, carboxylic acid or amino groups, is subjected to a shaping procedure, the reactive groups cause undesirable reactions, for example, cross-linking reactions to occur during the shaping procedure, and thus the mechanical properties and heat resistance of the resultant shaped article are affected. Therefore, the reactive terminal groups of the compound should be blocked so as to convert to non-reactive terminals.

If the compound has terminal amino groups, the terminals are blocked by reacting with a monocarboxylic acid compound, preferably a monocarboxylic acid chloride. If the terminal groups are carboxylic acid groups, they are blocked by reacting with a monoamine compound.

In the blocking procedure, the blocking agent, for example, the monocarboxylic acid compound or the monoamine compound, is added to the resultant reaction mixture of the dicarboxylic acid component and the diamine component. Otherwise, the resultant reaction product is collected or refined from the reaction mixture; the collected reaction product is dissolved in a solvent and then the blocking agent is added to the solution to block the reactive terminal groups therewith.

In the resin composition of the present invention, the light-resisting agent may consist of only one naphthalene ring-structure containing compound of the formula (I) or a mixture of two or more of the compounds.

In the resin composition of the present invention, the specific light-resisting agent is present preferably in an amount of from 0.1% to 20%, more preferably 0.2% to 15%, based on the weight of the wholly aromatic polyamide resin matrix.

When the content of the light-resisting agent in the resin matrix is less than 0.1% by weight, the resultant resin composition sometimes exhibits unsatisfactory light resistance.

The maximum content of the specific light-resisting agent in the resin matrix is variable depending on the chemical structure and the molecular weight of the naphthalene ring structure-containing compound of the formula (I) and the chemical structure of the wholly aromatic polyamide resin and compatibility thereof with the light-resisting agent.

To prevent a reduction in mechanical strength and other properties of the resultant shaped article, the content of the light-resisting agent in the resin matrix is preferably 20% or less, more preferably 15% or less, based on the weight of the resin matrix.

The naphthalene ring structure-containing compound of the formula (I) usable for the present invention is preferably selected from the following formulae:

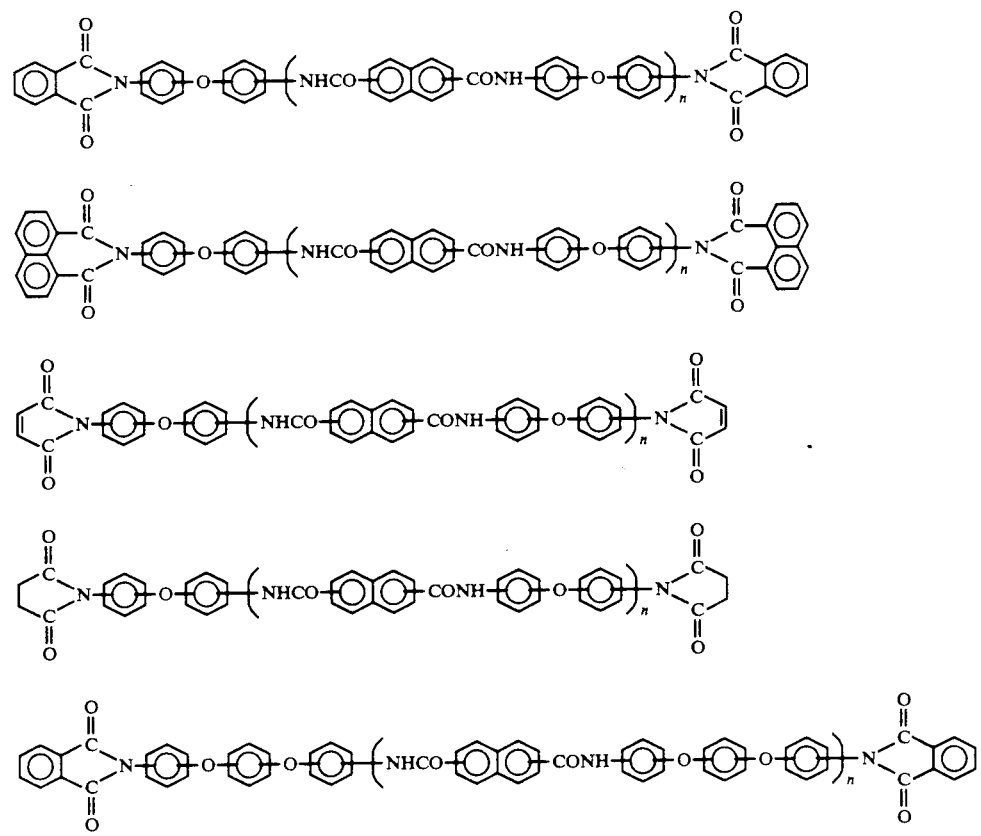

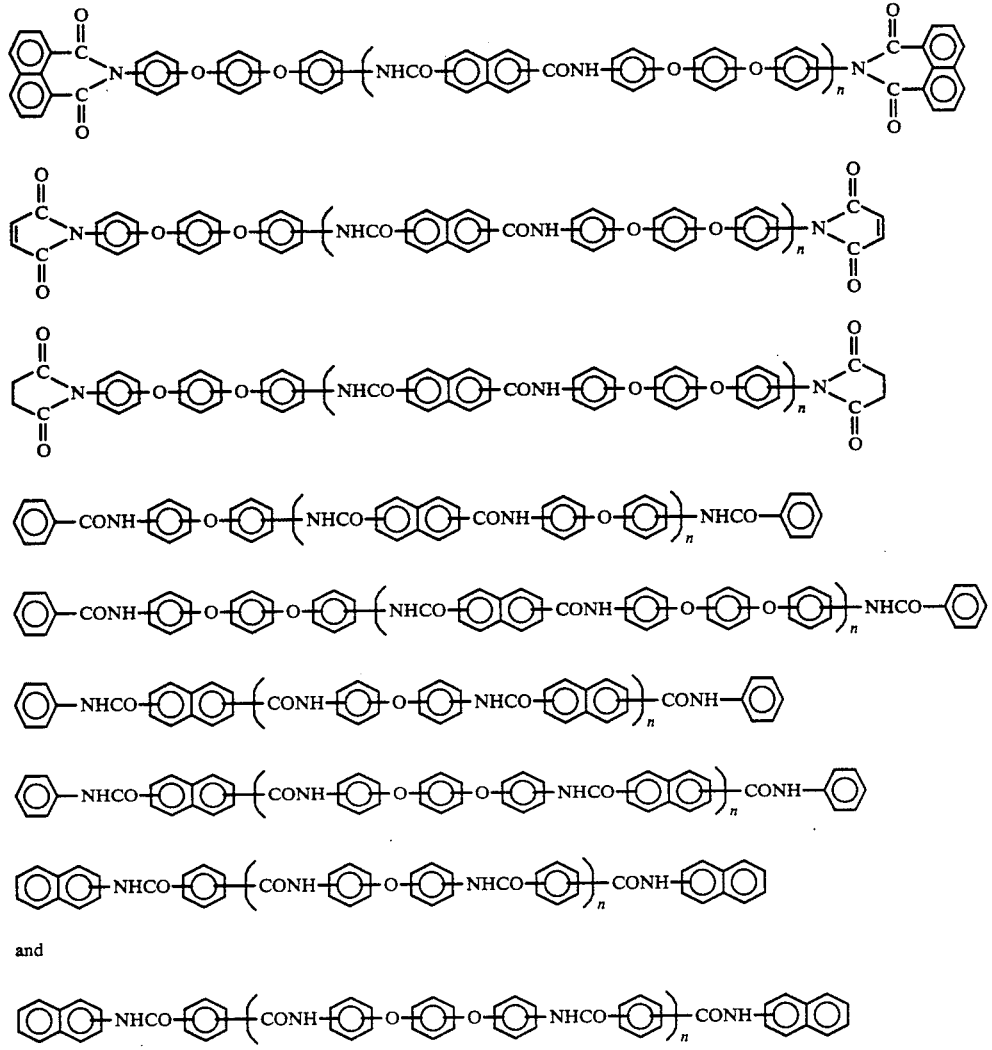

-continued

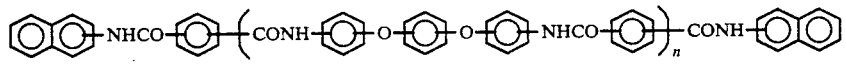

and

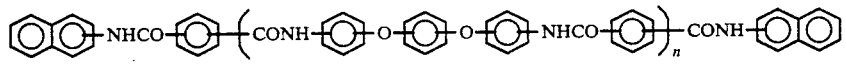

in which formulae n is as defined above.

Of course, the compounds of the formula (I) usable for the present invention are not restricted to those listed above.

The wholly aromatic polyamide resin usable as a matrix of the resin composition of the present invention is selected from polymerization and optionally imidization products of a dicarboxylic acid component consisting of at least one aromatic dicarboxylic acid halide with a diamine component consisting of at least one aromatic diamine, and may be a p-type aramid or a m-type aramid.

The aromatic diamine is preferably selected from a p-phenylene diamine, m-phenylene diamine, benzidine, 4,4'-diamino-p-terphenyl, 2,7-diamino-fluorene, 2,8-diaminophenoxthine, 1,4-, 1,5- and 2,6-naphthalenediamines, 3,3'-, 3,4'- and 4,4'-diaminodiphenylethers, 3,3'-, 3,4'-and 4,4'-diaminodiphenylamides, 3,3'-, 3,4'- and 4,4'-diaminodiphenylsulfides, 3,3'-, 3,4'-, and 4,4'-diaminodiphenylsulfones, 3,3'-, 3,4'- and 4,4'-diaminobenzophenones, diaminodiphenylmethanes, derivatives of the above-mentioned compounds having at least one aromatic ring structure attached with at least one non-reactive substituent, for example, lower alkyl, lower alkoxyl, halogeno or nitro group, 2,2-bis-4-(4-aminophenoxy)phenylpropane, 2,2-bis-4-(3-aminophenoxy)phenylpropane, 2,2-bis-4-(4-aminophenoxy)phenylhexafluoropropane, 2,2-bis-4-(3-aminophenoxy)phenylhexafluoropropane, bis-4-(4-aminophenoxy)phenylsulfone, bis-4-(3-aminophenoxy)phenylsulfone, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 4,4'-bis(4-aminophenoxy)biphenyl, 4,4'-bis(3-aminophenoxy)biphenyl, p-xylylenediamine, m-xylylenediamine, p-aminobenzylamine, m-aminobenzylamine, 9,10-bis(4-aminophenyl)anthracene, and 9,9-bis(4-aminophenyl)fluorene.

The preferable aromatic dicarboxylic acid halides are aromatic dicarboxylic acid chlorides and more preferably selected from terephthalic acid chloride, isophthalic acid chloride, 2,6- and 2,5-naphthalene dicarboxylic acid chlorides, 4,4'-diphenyldicarboxylic acid chloride and derivatives of the above-mentioned non-reactive compounds having at least one substituent, for example, lower alkyl, lower alkoxyl, halogeno or nitro group, attached to the aromatic ring structure thereof.

In the wholly aromatic polyamide resin usable for the present invention, it is preferable that at least 80 molar %, more preferably at least 90 molar %, of the recurring units comprises an aromatic amide group.

If the content of the aromatic amide recurring units is less than 80 molar %, the resultant resin sometimes exhibits unsatisfactory heat resistance and thus is not preferred.

Preferably, the aromatic polyamide usable for the present invention has at least 80 molar % of aromatic amide recurring units of the formula (II):

—NH—Ar$_4$—NHCO—Ar$_5$—CO—     (II)

wherein Ar$_4$ and Ar$_5$ respectively and independently from each other represent a member selected from the aromatic groups of the formulae:

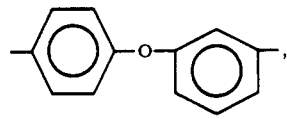

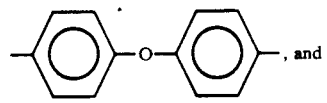

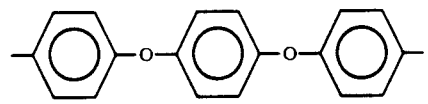

which aromatic groups may have at least one substituent selected from, for example, halogen atoms and lower alkyl groups, attached to at least one aromatic ring structure.

Also, it is preferable that at least 80 molar % of the aromatic groups in the aromatic polyamide molecules are at least one member selected from

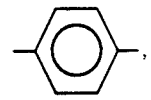

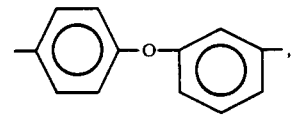

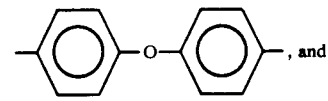

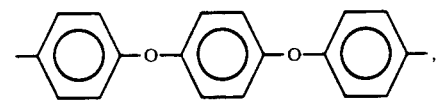

and from 10 molar % to 40 molar % of the aromatic group are at least one member selected from

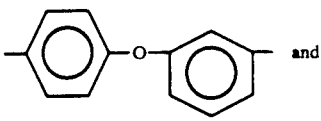

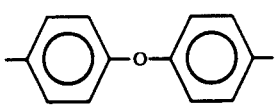

The wholly aromatic polyamide resin composition of the present invention is provided by blending the wholly aromatic polyamide resin with the light-resisting agent consisting of at least one naphthalene ring structure-containing compound of the formula (I).

In this blending procedure, a reaction mixture containing the compound of the formula (I) prepared by the above-mentioned method is blended to a solution of a wholly aromatic polyamide resin. In another blending manner, the compound of the formula (I) is isolated from the reaction mixture and then blended to the wholly aromatic polyamide resin solution. In still another blending manner, the isolated compound of the formula (I) is dissolved or dispersed in a liquid medium, and the resultant solution or slurry of the compound of the formula (I) is blended to the resin solution. In this manner, the liquid medium for the compound of the formula (I) is preferably compatible and thus can be uniformly mixed with the solvent for the aromatic polyamide resin.

The compound of the formula (I) is preferably uniformly dissolved in the aromatic polyamide resin matrix to provide a shaped article having satisfactory mechanical properties. However, as long as the resultant shaped article exhibits satisfactory mechanical properties, the compound of the formula (I) may be dispersed in the resin matrix.

The resin composition of the present invention can contain an additive comprising at least one member of, for example, an ultraviolet ray-absorbing agent, antioxidant, pigments and stabilizer.

The resin composition of the present invention can be converted to shaped articles, for example, fibers, films and other formed articles.

In a shaping method, a resin composition is finely pulverized or flaked, and the resultant particles or flakes are press-molded to produce shaped articles. In another shaping method, the resin composition is dissolved in an organic solvent, preferably a non-proton donating polar organic solvent, and the resultant dope solution is spread or cast to form a thin layer of the dope solution and the dope solution layer is then solidified by drying or coagulating.

In still another shaping method, the dope solution is converted to fibers or filaments by a wet spinning method in which the dope solution is extruded through a spinneret having a plurality of orifices and the resultant filamentary streams of the dope solution are introduced into a coagulating bath containing a coagulating agent, for example, N-methyl-2-pyrrolidone, N,N'-dimethylacetamide or dimethylsulfoxide, dissolved in water, to solidify the filamentary dope solution streams. This coagulating method can be applied to a film formation.

The wholly aromatic polyamide resin composition of the present invention has high light resistance and thermal stability, and thus is useful for producing shaped articles, for example, fibers or films, having high light resistance, superior heat resistance and excellent mechanical strength even when the shaped articles are produced through a drawing and/or heat treating procedure at a high temperature.

EXAMPLES

The present invention will be further explained by the following examples, which in no way restrict the scope of the present invention.

In the examples, the logarithmic viscosity numbers of aromatic polyamide resin were determined in a concentration of 0.5 g/100 m in a 98 weight % concentrated sulfuric acid at a temperature of 30° C. Also, the viscocities of the resin solution were measured using a falling ball viscosity test method.

Example 1

(1) Synthesis of wholly aromatic polyamide resin

A fully dried three necked flask equipped with a stirrer was charged with a mixture of 1832 parts by weight of N-methylpyrrolidone (NMP), 25.11 parts by weight of p-phenylene-diamine (PPDA) and 46.49 parts by weight of 3,4'-diaminodiphenylether (3,4'-DAPE) at room temperature and the mixture was converted to a solution while flowing a nitrogen gas through the flask. The solution was then provided with 94.28 parts by weight of terephthalic acid chloride (TPC) while stirring the solution. The resultant reaction mixture was subjected to a reaction procedure at a temperature of 85° C. for 60 minutes. A clear viscous polymer solution was obtained.

The polymer solution was neutralized by adding 152.9 parts by weight of a slurry containing 22.5 parts by weight of calcium hydroxide dispersed in NMP.

The resultant wholly aromatic polyamide resin had a logarithmic viscosity number of 3.40.

(2) Synthesis of naphthalene ring structure-containing compound of the formula (I)

In a fully dried three-necked flask equipped with a stirrer and filled by a nitrogen gas, 3,4'-DAPE was dissolved in a concentration of 5% by weight in NMP, and the resultant solution was gradually provided with 2,6-naphthalene dicarboxylic acid chloride (2,6-NDC) in a molar amount corresponding to ½ of the molar amount of 3,4'-DAPE, while stirring.

After stirring at a temperature of 85° C. for one hour, the reaction mixture was provided with phthalic anhydride (PHA) in a molar amount equal to the molar amount of 3,4'-DAPE, and then subjected to a reaction at a temperature of 204° C. for one hour while reflexing NMP. Thereafter, the resultant reaction mixture was cooled in an ambient atmosphere, spread in a large amount of water, and then filtered. The combined operations of spreading in a large amount of water and filtering were again effected. The filtered product was then spread in methyl alcohol and filtered. These combined spreading and filtering operations were repeated twice. The product was fully dried. The resultant product had a logarithmic viscosity number of 0.08.

The product was subjected to an infrared spectroscopic analysis. As a result, it was confirmed that the product had a naphthalene ring structure, an imide bond groups and an amide bond groups but did not contain an amino group or a carboxyl group. The product had a very sharp melting point of 256° C., which indicated that the product consisted of a single compound. Also, when the product was subjected to chromatographic analysis, it was confirmed that the product consisted of a single compound.

(3) Blend of wholly aromatic polyamide resin with naphthalene ring structure-containing compound of the formula (I)

The above-mentioned wholly aromatic polyamide resin solution was blended with the above-mentioned compound of the formula (I) in an amount of 3% based on the weight of the resin and in the state of a fine powder, and the blend was stirred at a temperature of 85° C. for 3 hours, to provide a transparent dope solution.

(4) Wet-spinning

The dope solution was extruded through a spinneret having 50 orifices each having an inside diameter of 0.3 mm, and the extruded filamentary streams of the dope solution was introduced into and coagulated in a coagulating both consisting of an aqueous solution of 30% by weight of NMP, to produce aromatic polyamide resin composition filaments. The distance between the lower face of the spinneret and the level of the coagulating bath was 10 mm.

The resultant filaments were washed with water, dried, and drawn in two steps first on a first heating plate at a temperature of 390° C. and a second heating plate at a temperature of 510° C., at a total draw ratio of 11.6. The resultant drawn filament yarn had a total thickness of 84.33 d tex (75.9 denier).

The molar ratio of the components in the above-mentioned compound of the formula (I), the concentration of the compound of the formula based on the weight of the resin and the total thickness of the resultant drawn filament yarn are shown in Table 1.

(5) Test

The resultant individual filaments had a tensile strength of 25.38 g/d tex (28.2 g/d), an ultimate elongation of 3.82% and a tensile modulus (Young's modulus) of 594 g/d tex (660 g/d).

The filament yarn was subjected to a Sunshine test with showering in accordance with Japanese Industrial Standard (JIS) L-0842, at the temperature of 63° C. for 100 hours. From the tensile strength and the ultimate elongation of the test filament yarns and those of the original filament yarn, a retention in tensile strength and a retention in ultimate elongated of the filament yarn were determined.

The test results are shown in Table 2.

Comparative Example 1

The same procedures as in Example 1 were carried out except that the naphthalene ring structure-containing compound of the formula (I) was not employed.

The resultant drawn filament yarn had a total thickness of 83.2 d tex (74.9 denier), and the individual filaments had a tensile strength of 24.39 g/d tex (27.1 g/d), an ultimate elongation of 3.69% and a tensile modulus of 576 g/d tex (640 g/d).

The light resistance test results of the filament yarn are shown in Table 2.

Namely, the omission of the naphthalene ring structure-containing compound resulted in the light resistance of the resultant filament yarn being lower than that of Example 1.

Examples 2 to 8 and Comparative Examples 2 to 5

In each of Examples 2 to 8 and Comparative Examples 2 to 5, the same procedures as in Example 1 were carried out except that the naphthalene structure-containing compound of the formula (I) was prepared from the components as shown in Table 1.

The light resistance test results of the resultant filament yarn are shown in Table 2.

In Comparative Examples 3 and 4, it was observed that after the sunshine test, the filament yarn was discolored.

product had a sharp melting point of 274° C., which indicated that the reaction product consisted of a single compound. Also, in the results of a high speed liquid chromatographic analysis, it was confirmed that the reaction product consisted of a single compound.

(2) Preparation of dope solution

The above-mentioned compound in the state of a fine powder was blended to the solution of the wholly aro-

TABLE 1

| Example No. | Type and molar ratio of components in compound of formula (I) | | Amount (%) of compound of the formula (I) based on resin weight | Total thickness of filament yarn | |
|---|---|---|---|---|---|
| | Components | Molar ratio | | d tex | (denier) |
| Example 1 | NDC/3,4'-DAPE/PHA | 1/2/2 | 3 | 84.3 | (75.9) |
| 2 | NDC/3,4'-DAPE/MAA | 1/2/2 | 3 | 84.8 | (76.3) |
| 3 | NDC/3,4'-DAPE/1,8-NDA | 1/2/2 | 3 | 80.6 | (72.5) |
| 4 | NDC/3,4'-DAPE/2,3-NDA | 1/2/2 | 3 | 82.1 | (73.6) |
| 5 | NDC/4,4'-DAPE/PHA | 1/2/2 | 3 | 83.1 | (74.8) |
| 6 | NDC/BAPOB/PHA | 1/2/2 | 3 | 83.6 | (75.2) |
| 7 | TPC/3,4'-DAPE/1,8-NDA | 1/2/2 | 3 | 81.0 | (72.9) |
| Comparative 1 | None | — | — | 83.2 | (74.9) |
| Example 2 | NDC/3,4'-DAPE/PHA | 1/2/2 | 0.05 | 82.4 | (74.2) |
| Example 8 | NDC/3,4'-DAPE/PHA | 1/2/2 | 0.1 | 85.7 | (77.1) |
| Comparative 3 | NDC/3,4'-DAPE | 1/2 | 3 | 83.6 | (75.2) |
| Example 4 | NDC/3,4'-DAPE | 2/1 | 3 | 83.1 | (74.8) |
| 5 | TPC/3,4'-DAPE/PHA | 1/2/2 | 3 | 84.0 | (75.6) |

Note:
NDC . . . 2,6-naphthalene dicarboxylic acid chloride
3,4'-DAPE . . . 3,4'-diaminodiphenylether
PHA . . . Phthalic anhydride
MAA . . . Maleic anhydride
1,8-NDA . . . 1,8-naphthalene dicarboxylic anhydride
2,3-NDA . . . 2,3-naphthalene dicarboxylic anhydride
4,4'-DAPE . . . 4,4'-diamino diphenylether
BAPOB . . . 1,4-bis(4-aminophenoxy) benzene
TPC . . . Terephthalic acid chloride

TABLE 2

| | Individual filament | | | | | | | |
|---|---|---|---|---|---|---|---|---|
| | Before sunshine test | | | After sunshine test | | | | |
| | Tensile strength | | Ultimate elongation | Tensile strength | | Retention | Ultimate elongation | Retention |
| Example No. | (g/d tex) | (g/d) | (%) | (g/d tex) | (g/d) | (%) | (%) | (%) |
| Example 1 | 25.4 | (28.2) | 3.82 | 16.5 | (18.3) | 65 | 2.75 | 72 |
| 2 | 24.9 | (27.7) | 3.76 | 14.7 | (16.3) | 59 | 2.44 | 65 |
| 3 | 24.7 | (27.4) | 3.69 | 16.6 | (18.4) | 67 | 2.77 | 75 |
| 4 | 24.6 | (27.5) | 3.70 | 16.8 | (18.7) | 68 | 2.81 | 76 |
| 5 | 24.0 | (26.7) | 3.66 | 16.1 | (17.9) | 67 | 2.78 | 76 |
| 6 | 24.3 | (27.0) | 3.60 | 16.3 | (18.1) | 67 | 2.66 | 74 |
| 7 | 24.2 | (26.9) | 3.61 | 16.5 | (18.3) | 68 | 2.78 | 77 |
| Comparative 1 | 24.4 | (27.1) | 3.69 | 11.4 | (12.7) | 47 | 1.88 | 51 |
| Example 2 | 25.0 | (27.8) | 3.75 | 12.1 | (13.4) | 48 | 1.99 | 53 |
| Example 8 | 25.2 | (28.0) | 3.77 | 13.6 | (15.1) | 53 | 2.26 | 60 |
| Comparative 3 | 24.5 | (27.2) | 3.62 | 11.3 | (12.5) | 46 | 1.81 | 50 |
| Example 4 | 24.3 | (27.0) | 3.61 | 11.0 | (12.2) | 45 | 1.77 | 49 |
| 5 | 24.8 | (27.5) | 3.72 | 11.6 | (12.9) | 47 | 1.97 | 53 |

Example 9

(1) Synthesis of naphthalene ring structure-containing compound of the formula (I)

The same procedures as in Example 1 were carried out except that the phthalic anhydride (PHA) was replace by benzoic acid anhydride. The types and molar ratio of the components are shown in Table 3.

The resultant polymer had a logarithmic viscosity number of 0.07. In the infrared spectroscopic analysis, it was confirmed that the reaction product had a naphthalene ring structure, an amide bond structure and did not have an amino group and a carboxyl group. Also, the matic polyamide resin as mentioned in Example 1. The amount of the compound mixed to the resin solution was 3% based on the weight of the resin. The blend was stirred at a temperature of 85° C. for 3 hours. A transparent dope solution was obtained.

(3) Wet spinning

The dope solution was subjected to the same wet spinning procedures as in Example 1.

The resultant undrawn filament yarn was drawn in two steps on a first heating plate at a temperature of 390° C. and then on a second heating plate at a temperature of 510° C., at a total draw ratio of 11.8. The drawn filament yarn had a total thickness of 84.9 d tex (76.4 denier). The individual filaments had a tensile strength of 25.3 g/d tex (28.1 g/d), an ultimate elongation of 3.81% and a tensile modulus of 59.0 g/d tex (655 g/d). These properties are shown in Table 3.

The light resistance test result is shown in Table 4.

Examples 10 to 13 and Comparative Examples 6 and 7

In each of the Examples 10 to 13 and Comparative Examples 6 and 7, the same procedures as in Example 1 were carried out except that the naphthalene ring structure-containing compound of the formula (I) was prepared from the components in the molar ratio as shown in Table 3.

The test results are shown in Table 4.

NDC were added to the solution while stirring. The reaction mixture was subjected to a reaction at a temperature of 85° C. for 10 minutes and 3.20 parts by weight (0.034 mole) of aniline were then added to the reaction mixture. The reaction mixture was further stirred at a temperature of 85° C. for 10 minutes.

The resultant reaction mixture was neutralized with 113.3 parts by weight of a slurry containing 22.5% by weight (0.344 mole) of calcium hydroxide dispersed in NMP.

The resultant product had a logarithmic viscosity number of 2.54. By infrared spectroscopic analysis, it was confirmed that the resultant compound had a naphthalene ring structure and amide and imide groups but

TABLE 3

| Example No. | | Type and molar ratio of components in compound of formula (I) | | Amount (%) of compound of the formula (I) based on resin weight | Total thickness of filament yarn | |
|---|---|---|---|---|---|---|
| | | Components | Molar ratio | | d tex | (denier) |
| Example | 9 | NDC/3,4'-DAPE/BAC | 1/2/2 | 3 | 84.9 | (76.4) |
| | 10 | NDC/4,4'-DAPE/BAC | 1/2/2 | 3 | 85.8 | (77.2) |
| | 11 | NDC/BAPOB/BAC | 1/2/2 | 3 | 83.7 | (75.3) |
| | 12 | TPC/3,4'-DAPE/NAC | 1/2/2 | 3 | 83.2 | (74.9) |
| Comparative Example | 6 | NDC/3,4'-DAPE/BAC | 1/2/2 | 0.05 | 83.1 | (74.8) |
| Example 13 | | NDC/3,4'-DAPE/BAC | 1/2/2 | 0.1 | 83.1 | (75.3) |
| Comparative Example | 7 | TPC/3,4'-DAPE/BAC | 1/2/2 | 3 | 84.3 | (75.9) |

Note:
BAC ... Benzoic acid chloride
NAC ... 2-naphthoic acid chloride

TABLE 4

| | Individual filament | | | | | | |
|---|---|---|---|---|---|---|---|
| | Before sunshine test | | | After sunshine test | | | |
| | Tensile strength | | Ultimate elongation | Tensile strength | | Retention | Ultimate elongation Retention |
| Example No. | (g/d tex) | (g/d) | (%) | (g/d tex) | (g/d) | (%) | (%) |
| Example 9 | 25.3 | (28.1) | 3.81 | 15.2 | (16.9) | 60 | 2.67 70 |
| 10 | 24.3 | (27.0) | 3.61 | 15.3 | (17.0) | 63 | 2.60 72 |
| 11 | 24.4 | (27.1) | 3.62 | 15.6 | (17.3) | 64 | 2.61 72 |
| 12 | 24.8 | (27.6) | 3.75 | 15.1 | (16.8) | 61 | 2.66 71 |
| Comparative Example 6 | 24.9 | (27.7) | 3.74 | 11.7 | (13.0) | 47 | 1.94 52 |
| Example 13 | 25.1 | (27.9) | 3.76 | 13.1 | (14.5) | 52 | 2.22 59 |
| Comparative Example 7 | 24.7 | (27.4) | 3.71 | 11.6 | (12.9) | 47 | 2.04 55 |

Example 14

The same procedures as in Example 1 were carried out with the following exceptions.

(1) Synthesis of naphthalene ring structure-containing compound.

A fully dried three necked flask with a stirrer was charged with a mixture of 1912 parts by weight of NMP, 65.44 parts by weight 10,327 moles, of 3,4'-DAPE at room temperature, the mixture was converted to a solution while directing nitrogen gas through the flask, and then 87.08 parts by weight (0.344 mole) of did not have carboxyl and amino groups.

(2) Preparation of dope solution.

The solution of the wholly aromatic polyamide resin in a concentration of 6% by weight in NMP was mixed with the solution of the above-mentioned naphthalene ring structure-containing compound in a concentration of 6% by weight in NMP, in a weight ratio of 100:10.

(3) The resultant filament yarn had a total thickness of 83.7 d tex (75.3 denier). The test results of Example 14 are shown in Table 5 comparatively with Comparative Example 1.

TABLE 5

| | Individual filament | | | | | | |
|---|---|---|---|---|---|---|---|
| | Before sunshine test | | After sunshine test | | | | |
| | Tensile strength | Ultimate elongation | Tensile strength | | Retention | Ultimate elongation | Retention |
| Example No. | (g/d tex) (g/d) | (%) | (g/d tex) | (g/d) | (%) | (%) | (%) |
| Example 14 | 23.5 (26.1) | 3.60 | 15.3 | (17.0) | 65 | 2.41 | 67 |
| Comparative Example 7 | 24.4 (27.1) | 3.69 | 11.4 | (12.7) | 47 | 1.88 | 51 |

Note:
Total thickness of drawn filament yarn:
Example 18 . . . 83.7 d tex (75.3 denier)
Comparative Example 1 . . . 83.2 (74.9 denier)

We claim:
1. A wholly aromatic polyamide resin composition comprising:
   a matrix consisting essentially of a wholly aromatic polyamide resin; and
   a light-resisting agent blended to the wholly aromatic polyamide resin matrix and comprising at least one naphthalene ring structure-containing compound of the formula (I):

wherein $Ar_1$, $Ar_2$ and $Ar_3$ respectively and independently from each other represent a divalent organic group, X represents an amide bond group of the formula —CONH—, Y represents a member selected from the group consisting of an amide bond group of the —CONH— formula and an imide bond group of the formula of

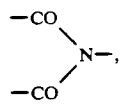

A and B respectively and independently from each other a monovalent organic group when Y represents the amide bond group and a divalent organic group when Y represents the imide bond group;
   n represents an integer of from 1 to 10, and at least one of $Ar_1$, $Ar_2$, $Ar_3$, A and B has a naphthalene ring structure.

2. The resin composition as claimed in claim 1, wherein the light-resisting agent is present in an amount of from 0.1% to 20% based on the weight of the wholly aromatic polyamide resin matrix.

3. The resin composition as claimed in claim 1, wherein at least one of the divalent organic groups represented by $Ar_1$, $Ar_2$ and $Ar_3$ in the formula (I) is selected from the group consisting of unsubstituted and substituted 2,6-naphthalene group and the divalent aromatic groups of the formulae:

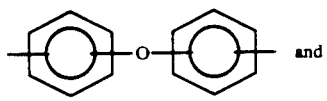 and

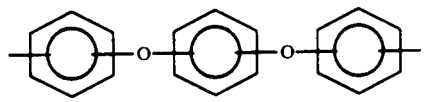

4. The resin composition as claimed in claim 1, wherein the monovalent organic group represented by A or B when Y is an amide bond group in the formula (I) is selected from the group consisting of unsubstituted and substituted 1-naphthyl, 2-naphthyl, and phenyl groups.

5. The resin composition as claimed in claim 1, wherein the divalent organic group represented by A or B when Y is an imide group in the formula (I) is selected from the group consisting of unsubstituted and substituted 1,2-naphthylene, 2,3-naphthylene, 1,8-naphthylene, 1,2-phenylene, ethylene and vinylene groups.

6. The resin composition as claimed in claim 1, wherein the naphthalene ring structure-containing compound of the formula (I) is selected from the following formulae:

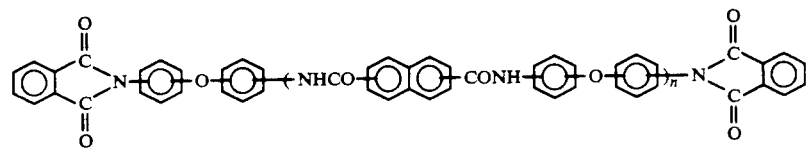

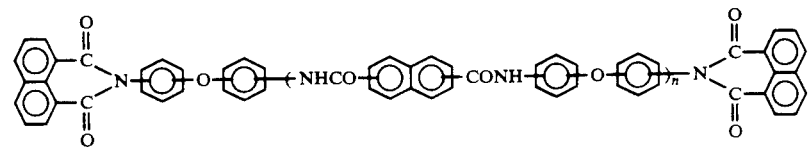

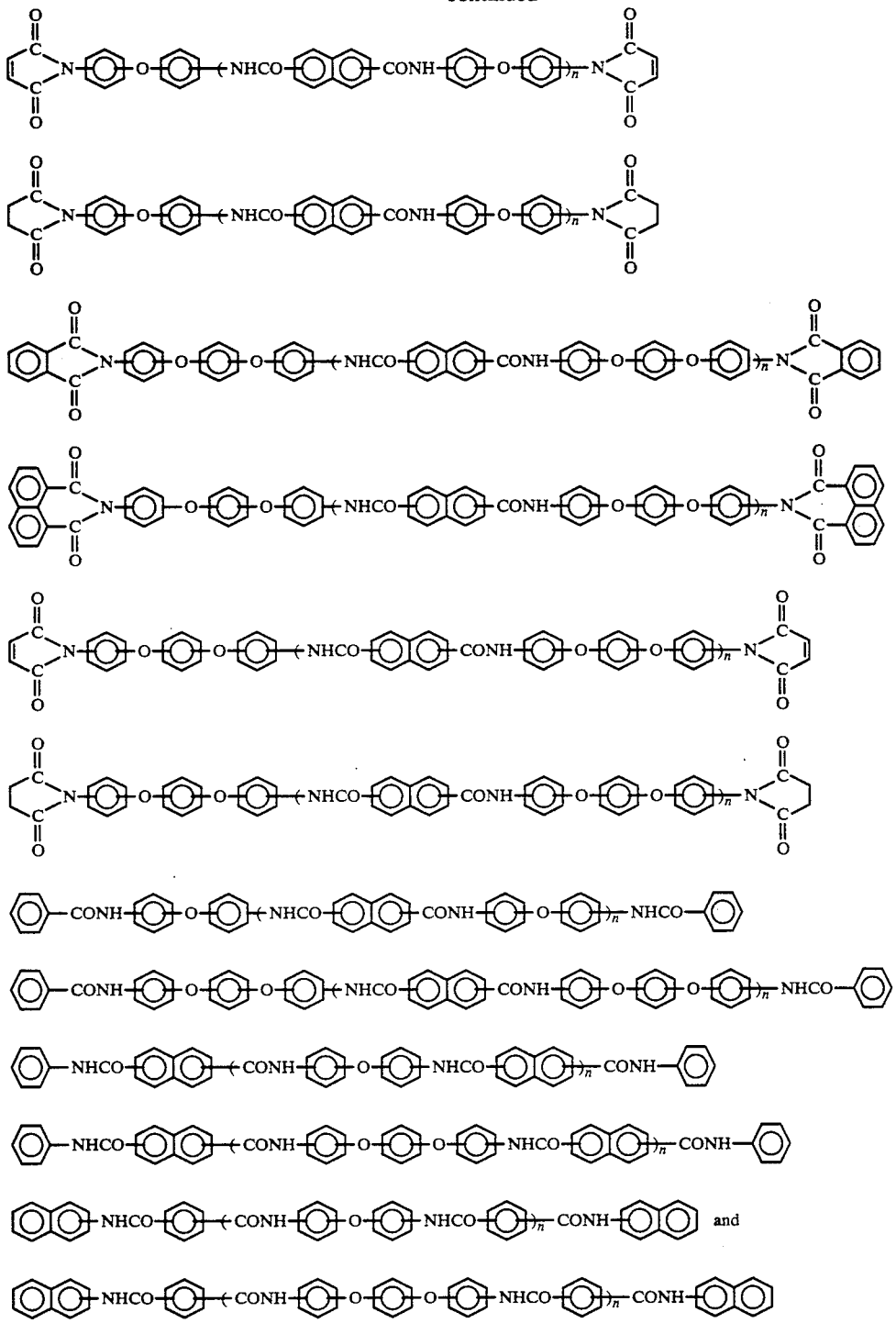

in which formulae n is as defined above.

7. The resin composition as claimed in claim 1, wherein the naphthalene ring structure-containing compound of the formula (I) is soluble in a non-proton donating polar organic solvent.

8. The resin composition as claimed in claim 1, wherein at least one of the divalent organic groups represented by $Ar_1$, $Ar_2$ and $Ar_3$ in the formula (I) is an aromatic group having at least one ether bond of the formula —O—.

9. A shaped article comprising the wholly aromatic polyamide resin composition as claimed in claim 1.

10. A method of producing a shaped article from the wholly aromatic polyamide resin composition as claimed in claim 1, wherein the wholly aromatic polyamide resin composition is dissolved in a non-proton donating polar organic solvent to provide an isotropic solution and the isotropic solution of the wholly aromatic polyamide resin composition is converted to a shaped article.

* * * * *